C. P. GROUT,

Assignor to J. W. WHITE, J. C. WHITE, and H. M. LEWIS, Trustees of S. S. WHITE, dec'd.

Machines for Transmitting Motion.

No. 9,284. Reissued July 6. 1880.

WITNESSES

Wm. A. Skinkle.

Chas. H. Baker.

INVENTOR

Charles. P. Grout.

By his Attorneys

Goldsborough, Hopkins & Peyton

UNITED STATES PATENT OFFICE.

CHARLES P. GROUT, OF NEW YORK, N. Y., ASSIGNOR TO JAMES W. WHITE, J. CLARENCE WHITE, AND HENRY M. LEWIS, TRUSTEES OF SAMUEL S. WHITE, DECEASED.

MACHINE FOR TRANSMITTING MOTION.

SPECIFICATION forming part of Reissued Letters Patent No. 9,284, dated July 6, 1880.

Original No. 125,809, dated April 16, 1872. Application for reissue filed May 24, 1880.

*To all whom it may concern:*

Be it known that I, CHARLES P. GROUT, of the city, county, and State of New York, have invented certain new and useful Improvements in Machines for Transmitting Motion in various directions, applicable to dentists' tools and other instruments, of which the following is a full, clear, and exact description, reference being had to the accompanying drawings, forming part of this specification, which show my said improvements as embodied in the best way known to me at the date of filing my application for the original patent.

Figure 1:
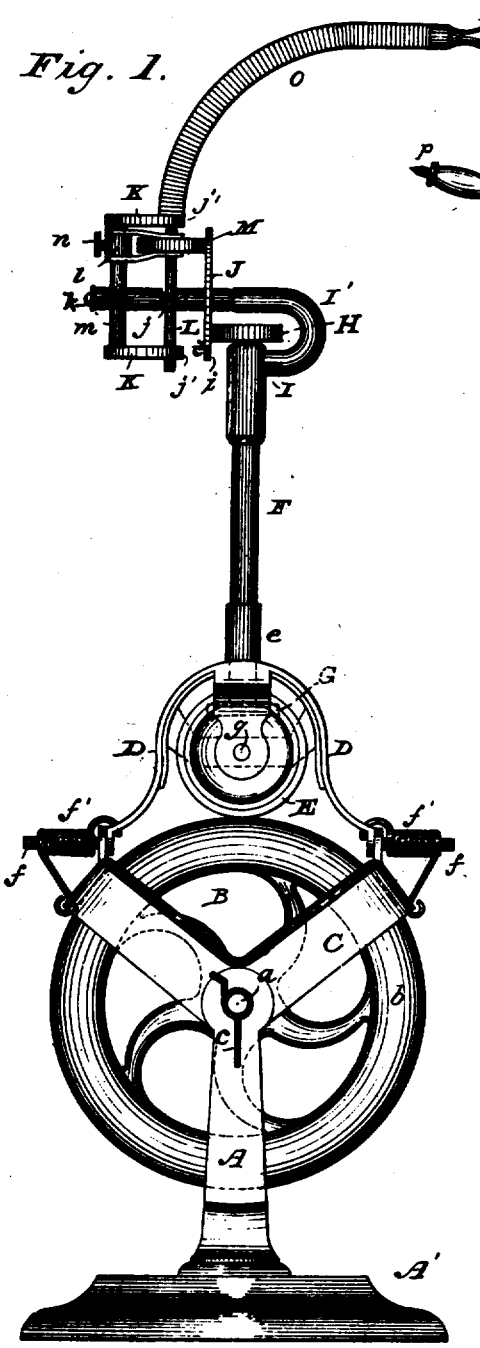
Figure 2:
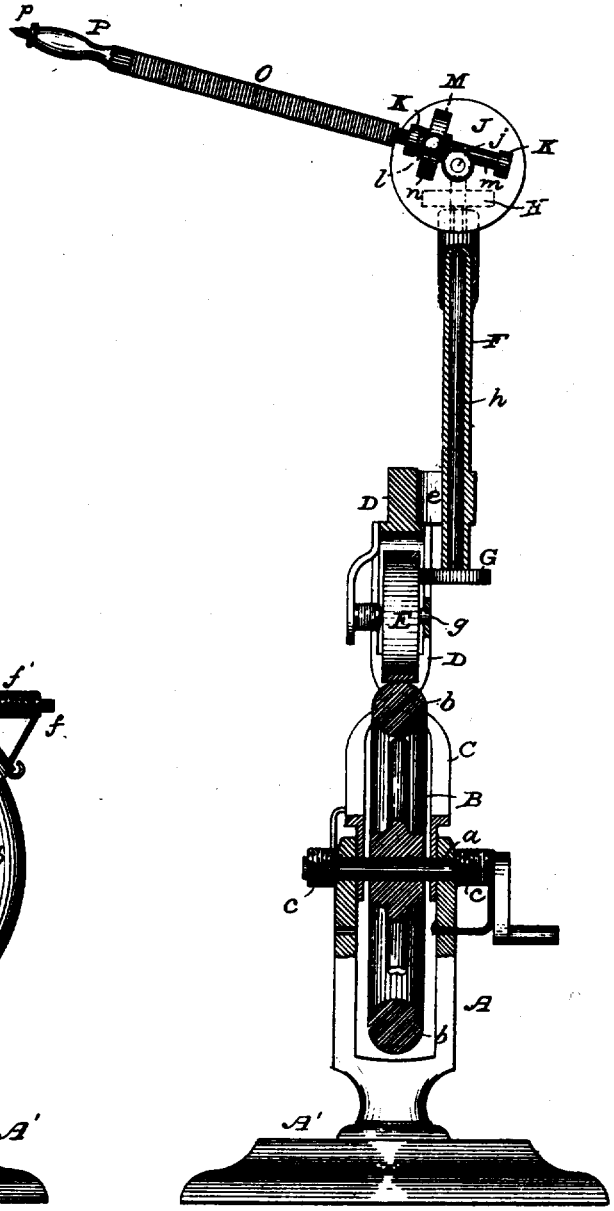

In said drawings, Figure 1 represents a side elevation of a machine embodying my improvements organized as a dental engine, and Fig. 2 is a vertical central section thereof.

In some types of dental engines constructed prior to my invention there have been combined a base, an upright engine-arm connected to the base and capable of a rocking motion thereon in one plane or direction, a flexible shaft or power-conveyer connected with the upper end of said arm and receiving motion from a driving wheel or pulley at the lower end of said arm, and a spindle-chuck connected with the outer end of said flexible shaft so as to be given a rapid revolving motion in its bearings in a hand-piece casing which is grasped by the fingers and is free to be moved about in various directions to enable the tool driven by the chuck to operate at different points without interruption to the transmission of the driving power.

The purpose or object of making the engine-arm a rocking arm is to enable a wider range of movement to be given to the operating-tool with the same length of driving-shaft than could be given to the tool were the said shaft connected with a rigid upright arm incapable of being moved out of the perpendicular. This rocking capacity, or the capacity of being moved out of the perpendicular, also enables the shaft to be operated with greater freedom than if connected with a rigid upright engine-arm. It had never been demonstrated, however, prior to the date of my invention, as far as I am aware, that an engine for drilling teeth having the elements before mentioned could be so constructed as to have the capacity in itself of enabling the engine-arm to be moved out of the perpendicular not only in a backward and forward direction in line with the plane of revolution of the driving wheel or pulley, as usual, but also across said plane, or, in other words, of enabling the engine-arm to be thrown out of the perpendicular in directions substantially at right angles to or crosswise of each other. This capacity of moving the engine-arm out of the perpendicular in planes crossing each other enables a remarkably wide range of movement to be given the operating-tool in all directions while permitting a comparatively short flexible driving-shaft to be used, the advantages of which are well known to users of this class of machines, the upper end of the engine-arm being adapted to be moved close to the patient to give free movement to the shaft and hand-piece without necessarily locating the base and treadle inconveniently close to the operating-chair.

This capacity which I have given to dental engines—to wit, enabling the engine-arm to be moved out of the perpendicular in planes crosswise of each other by mechanism constituting part of the engine itself—is the prime and most important feature of my invention, and when the flexible power-conveyer is connected with the upper end of said arm by connections which permit the said shaft to be moved horizontally around upon the arm, as well as rocked vertically relatively thereto, a dental engine is obtained which is, in my opinion, vastly superior to any of the old forms, which either enable the engine-arm to be moved out of the perpendicular in one direction or plane only, or permit no such movement at all by mechanism forming a part of the engine.

An upright standard, A, is formed with or rigidly secured to a base, A′. Said standard is shown as forked, and is provided with or contains bearings for a horizontal shaft, *a*, on which the driving-wheel B is firmly secured. Said driving-wheel has a rim, *b*, which is circular in its transverse section.

A carrier, C, is made V-shaped, and is forked so as to straddle the rim of the driving-wheel B, on both sides of which it is attached or pivoted to the shaft *a* in such manner as to be capable of swinging parallel with the plane of rotation of the said driving-wheel. Springs *c c*, coiled around the shaft *a* and attached to the said carrier and to the standard A, tend to keep the said carrier in an upright position above the axis of the wheel B, as shown in Fig. 1, when not otherwise displaced from that position.

An arched yoke, D, is connected by pivots *f f*, formed on its ends, to the top of the carrier or saddle C, the axis of said pivots being in a line parallel with the plane of rotation of the driving-wheel B, or crosswise of the pivotal connection of the carrier C with the standard A, and passing through the center of the circular transverse section of the rim *b* of said driving-wheel.

A friction-wheel, E, runs on the circular rim *b* of the driving-wheel. Said wheel E is firmly secured to a short shaft, *g*, working in bearings provided for it in the yoke D, and its rim is covered with india-rubber or other elastic material to make it hug the rim *b* of the wheel B. Said friction-wheel E, being thus confined within the yoke D, is enabled to revolve on the rim of the wheel B in the plane of rotation of the latter, or transversely on the same, always remaining in contact with the said wheel, so that it may derive therefrom a rotary motion on its own axis.

Springs *f' f'* are applied to the pivots *f f* of the yoke D in such manner that the tension thereof will always tend to keep the yoke D parallel with the plane of rotation of the driving-wheel when not otherwise displaced.

A tubular upright or normally-perpendicular engine-arm, F, is rigidly attached by an extension, *e*, to the yoke D, and serves to contain an upright shaft, *h*, which is a part of the driving mechanism. To the lower end of said shaft *h* a friction-wheel, G, is firmly attached, the rim of said wheel, which comes in contact with the roughened surface of one side of the friction-wheel E, being covered with india-rubber or elastic material to insure its receiving rotary motion from said wheel E. At the upper end of said shaft *h* another wheel, H, similar to the wheel G, is secured, and close under the said wheel H, which is at the upper end of the engine-arm F, a swivel, I, is arranged to turn loosely on the said upper end of said tubular engine-arm. On the upper end of said swivel or turning portion I there is a curved arm, I', which reaches over the wheel H to carry a shaft, *j*, arranged at right angles with the upright shaft *h*, the said shaft *j* being rigidly secured to the said arm I'.

A friction wheel or disk, J, is fitted to turn freely on the shaft *j*, and is so situated that its side surface, *i*, comes in contact with the rim of the wheel H to receive motion therefrom. Said wheel J is enabled, by the manner of its connection with the swivel I, to turn all around the wheel H and still remain always in contact or frictional gear therewith.

A frame, K, is arranged to swing loosely on that end of the shaft *j* which is farthest from the swivel I, so that the said frame may have a vertical rocking capacity at right angles to the horizontal turning movements of the swivel I upon the engine-arm. Said frame K contains the bearings *j' j'* for a rotating shaft, L, which is situated at right angles to the shaft *j*.

A wheel, M, similar to the wheels G H, is firmly secured to that portion of the stiff shaft L which is between the bearings *j' j'*, such portion being on one side of the shaft *h*. Said wheel M is adjusted in contact with the side surface, *i'*, of the friction-wheel J by means of a nut, *k*, screwed onto a screw-thread on the end of the shaft *j*.

To enable the wheel M to obtain more or less speed, it can be moved toward the center of the friction-wheel J or away from it by making the shaft L longitudinally adjustable, which is effected by a forked slide, *l*, working on the rod *m* of the rocking frame K. The prongs of said slide, reaching to both sides of the wheel M, carry the latter and the shaft L with it. By means of a set-screw, *n*, the slide *l* can be secured in any desired position.

In cases where a dentist's drill or tool is to be operated, which is the most important and useful application of my improvements, a flexible torsion-shaft or power-conveyer, O, is connected endwise with the stiff shaft L, so as to have a rapid revolving motion imparted to it, which motion is communicated to a rotary tool-holder, *p*, connected with the outer end of said flexible shaft and turning in the hand-piece casing P, which is grasped by the fingers and moved about in various directions to hold the tool to its work, and to guide it, as required, without interruption to the transmission of the driving power through the flexible shaft.

The driving-wheel B, being set in motion by a hand-crank on the shaft *a*, or by a treadle connected with said shaft, or by any other convenient means, produces the rotation of the friction-wheel E, from which motion is transmitted to the wheel G, rotating the shaft *h* and wheel H, which latter transmits motion to the friction-wheel J, being in contact therewith on one side, while the other side of the friction-wheel J is in contact with the wheel M, thus rotating the latter, which then turns the shaft L and the flexible shaft or power-conveyer O.

By reason of the crosswise pivotal connections (the carrier C and yoke D with their pivots) the engine-arm F, which, unless displaced, lies in a vertical or perpendicular position, is capable of being moved out of the perpendicular either sidewise or in a backward and forward direction, the planes of movement being crosswise of each other, whereby great freedom of movement is given to the flexible shaft and hand-piece. The upper end of the said arm may be moved out of the perpendicular into position in front of the patient seated in the operating-chair without necessitating the location of the engine inconveniently close to the chair, thus enabling a comparatively short flexible shaft to be used, which has many advantages, while giving the hand-piece a wide range of movement in all directions.

I believe myself to be the first ever to have given a dental engine the capacity of having its arm moved out of the perpendicular in planes crossing each other by mechanism constituting a part of the engine. This capacity of the engine, coupled with the capability of the flexible shaft to be moved horizontally upon the engine-arm, as well as rocked vertically relatively thereto by means of its turning and rocking connections (the swivel I and rocking-frame K) with said arm, affords a dental engine superior to any existing prior to my invention of which I have had cognizance.

It will, of course, be understood that I do not claim the frictional driving-gearing which is hereinbefore described, as that is an old form of driving-gearing.

I claim as my invention—

1. The combination, substantially as hereinbefore set forth, of the base, the upright engine-arm, and two pivotal or jointed connections crosswise of each other, whereby said engine-arm may be moved out of the perpendicular in directions crosswise of each other.

2. The combination, substantially as hereinbefore set forth, of the base, the upright engine-arm, the flexible shaft at the upper end of said arm, and two pivotal or jointed connections crosswise of each other, by which said engine-arm may be moved out of the perpendicular in directions crosswise of each other, whereby freedom and a wide range of movement are given to the said shaft.

3. The combination, substantially as hereinbefore set forth, of the base, the upright engine-arm capable of being moved out of the perpendicular in directions crosswise of each other, the flexible shaft at the upper end of said arm, and a connection by which the flexible shaft may be turned horizontally upon said arm.

4. The combination, substantially as hereinbefore set forth, of the base, the upright engine-arm capable of being moved out of the perpendicular in directions crosswise of each other, the flexible shaft at the upper end of said arm, and a connection by which the said flexible shaft may be moved vertically relatively to said arm, in addition to its flexing capability.

5. The combination, substantially as hereinbefore set forth, of the base, the upright engine-arm capable of being moved out of the perpendicular in directions crosswise of each other, the flexible shaft at the upper end of said arm, and connections by which the shaft may be both turned horizontally around upon said arm and rocked vertically relatively thereto.

6. The combination, substantially as hereinbefore set forth, of the upright engine-arm, the flexible shaft, the stiff shaft to which said flexible shaft is connected and by which it is driven, and a vertically-rocking connection between said engine-arm and said flexible shaft, in which the said stiff shaft may move endwise.

7. The combination, substantially as hereinbefore set forth, of the upright engine-arm, the flexible shaft, the stiff shaft to which said flexible shaft is connected and by which it is driven, a vertically-rocking connection between said engine-arm and said flexible shaft, in which the said stiff shaft may be moved endwise, and a device to determine the endwise relationship of said stiff shaft to the said rocking connection.

8. The combination, substantially as hereinbefore set forth, of the upright engine-arm, the flexible shaft, a turning connection between said shaft and engine-arm which permits the flexible shaft to be turned horizontally upon the engine-arm, and the stiff shaft, with which the flexible shaft is connected, movable endwise in bearings in said turning connection.

9. The combination, substantially as hereinbefore set forth, of the base, the upright engine-arm capable of being moved out of the perpendicular by mechanism forming part of the engine, horizontally-turning and vertically-rocking connections at the upper end of said arm, a stiff shaft mounted in bearings in said rocking connection, and a flexible torsion-shaft connected endwise with said stiff shaft to drive a dental tool.

In testimony whereof I have hereunto subscribed my name.

CHAS. P. GROUT.

Witnesses:
FREDK. HAYNES,
A. C. WEBB.